(12) United States Patent
Harada et al.

(10) Patent No.: US 12,171,025 B2
(45) Date of Patent: Dec. 17, 2024

(54) TERMINAL AND COMMUNICATION METHOD

(71) Applicant: NTT DOCOMO, INC., Tokyo (JP)

(72) Inventors: Hiroki Harada, Tokyo (JP); Shinya Kumagai, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 342 days.

(21) Appl. No.: 17/759,079

(22) PCT Filed: Feb. 13, 2020

(86) PCT No.: PCT/JP2020/005670
§ 371 (c)(1),
(2) Date: Jul. 19, 2022

(87) PCT Pub. No.: WO2021/161483
PCT Pub. Date: Aug. 19, 2021

(65) Prior Publication Data
US 2023/0049707 A1    Feb. 16, 2023

(51) Int. Cl.
*H04W 74/0816* (2024.01)
*H04W 74/08* (2024.01)

(52) U.S. Cl.
CPC ... *H04W 74/0816* (2013.01); *H04W 74/0866* (2013.01)

(58) Field of Classification Search
CPC ......... H04W 74/0816; H04W 74/0866; H04W 74/0808; H04W 16/14; Y02D 30/70
See application file for complete search history.

(56) References Cited

U.S. PATENT DOCUMENTS

| | | | |
|---|---|---|---|
| 2019/0073635 A1 | 3/2019 | Baldwin et al. | |
| 2019/0261412 A1 | 8/2019 | Novlan et al. | |
| 2020/0178179 A1* | 6/2020 | Vargantwar | H04W 74/0816 |
| 2022/0132574 A1* | 4/2022 | Bendlin | H04W 74/0816 |
| 2022/0361243 A1* | 11/2022 | Koorapaty | H04W 24/10 |

FOREIGN PATENT DOCUMENTS

| | | |
|---|---|---|
| JP | 2019-140436 A | 8/2019 |
| WO | 2018/059512 A1 | 4/2018 |
| WO | 2019/067461 A1 | 4/2019 |

OTHER PUBLICATIONS

International Search Report issued in PCT/JP2020/005670, mailed on Aug. 18, 2020 (7 pages).
Written Opinion of the International Searching Authority issued in PCT/JP2020/005670, mailed on Aug. 18, 2020 (5 pages).

(Continued)

*Primary Examiner* — Yaotang Wang
(74) *Attorney, Agent, or Firm* — Osha Bergman Watanabe & Burton LLP (57) ABSTRACT

A terminal includes a control unit configured to perform LBT (Listen before talk) in a frequency band above a predetermined frequency, and a transmission unit configured to transmit a signal based on a result of the LBT, wherein the control unit performs the LBT with a mechanism different from LBT performed in a frequency band below the predetermined frequency.

4 Claims, 7 Drawing Sheets

(56) References Cited

OTHER PUBLICATIONS

Ericsson; "Wideband operation for NR-U"; 3GPP TSG-RAN WG1 Meeting #96b, R1-1904339; Xi'an, China, Apr. 8-12, 2019 (9 pages).
LG Electronics; "Summary #2 on wide-band operation for NR-U"; 3GPP TSG RAN WG1 #96bis, R1-1905779; Apr. 8-12, 2019 (22 pages).
Nokia, Nokia Shanghai Bell; "On support of UL transmission with configured grants in NR-U"; 3GPP TSG RAN WG1 Meeting #97, R1-1906645; Reno, US, May 13-17, 2019 (11 pages).
3GPP TS 38.300 V16.0.0; "3rd Generation Partnership Project; Technical Specification Group Radio Access Network; NR; NR and NG-RAN Overall Description; Stage 2 (Release 16)"; Dec. 2019 (6 pages).
NTT Docomo, Inc., White Paper; "5G Evolution and 6G"; Jan. 2020 (17 pages).
3GPP TR 38.807 V16.0.0; "3rd Generation Partnership Project; Technical Specification Group Radio Access Network; Study on requirements for NR beyond 52.6 GHZ (Release 16)"; Dec. 2019 (68 pages).
3GPP TS 37.213 V16.0.0; "3rd Generation Partnership Project; Technical Specification Group Radio Access Network; Physical layer procedures for shared spectrum channel access (Release 16)"; Dec. 2019 (25 pages).
Extended European Search Report issued in counterpart European Patent Application No. 20918507.3 mailed on Sep. 26, 2023 (6 pages).

\* cited by examiner

TERMINAL AND COMMUNICATION METHOD

FIELD OF THE INVENTION

The present invention relates to a terminal and a communication method in a wireless communication system.

BACKGROUND OF THE INVENTION

Regarding NR (New Radio) (also referred to as "5G"), or a successor system to LTE (Long Term Evolution), technologies have been discussed which satisfy the following requirements: a high capacity system, high data transmission rate, low delay, simultaneous connection of multiple terminals, low cost, power saving, etc. (for example, Non-Patent Document 1). 5G is a mobile communication system that supports a high-frequency band exceeding 10 GHz such as millimeter waves. Ultra high-speed wireless data communications of several Gbps class can be realized using frequency bandwidth of several hundred MHz class, which is significantly wider than conventional systems such as LTE On the other hand, millimeter-wave technologies in mobile communications have much scope for future development, and discussions of Beyond 5G and 6G as systems after 5G have been started (for example, Non-Patent Document 2). Expansion of new frequency band has been discussed as a candidate of discussion issue for Beyond 5G and 6G. For example, the new frequency band is a frequency band above 100 GHz, a terahertz band, and the like.

CITATION LIST

Non-Patent Document

[Non-Patent Document 1] 3GPP TS 38.300 V16.0.0 (2019-12)
[Non-Patent Document 2] NTT DOCOMO, INC., White Paper "5G Evolution and 6G" (2020-01)
[Non-Patent Document 3] 3GPP TR 38.807 V16.0.0 (2019-12)
[Non-Patent Document 4] 3GPP TS 37.213 V16.0.0 (2019-12)

SUMMARY OF THE INVENTION

Technical Problem

In the conventional LBT (Listen before talk) in NR, the bandwidth in consideration of coexistence with the wireless LAN (Local area network) has been targeted. On the other hand, for LBT in the high-frequency band, coexistence with wireless systems having a much larger bandwidth than conventional ones needs to be considered.

The present invention has been made in view of the above points, and it is an object of the present invention to perform LBT (Listen before talk) adapted to a coexisting wireless communication system in a wireless communication system.

Solution to Problem

According to the disclosed technique, a terminal is provided that includes a control unit configured to perform LBT (Listen before talk) at a frequency band above a predetermined frequency, and a transmission unit configured to transmit a signal based on a result of the LBT, wherein the control unit performs the LBT with a mechanism different from an LBT performed at a frequency band below the predetermined frequency.

Advantageous Effects of Invention

According to the disclosed technique, LBT (Listen before talk) adapted to a coexisting wireless communication system can be performed in a wireless communication system.

DETAILED DESCRIPTION OF THE PREFERRED EMBODIMENTS

In the following, referring to the drawings, one or more embodiments of the present invention will be described. It should be noted that the embodiments described below are examples. Embodiments of the present invention are not limited to the following embodiments.

In operations of a wireless communication system according to an embodiment of the present invention, conventional techniques will be used appropriately. With respect to the above, for example, the conventional techniques are related to, but not limited to, the existing LTE. Further, it is assumed that the term "LTE" used in the present specification has, unless otherwise specifically mentioned, a broad meaning including a scheme of LTE-Advanced and a scheme after LTE-Advanced (e.g., NR).

Furthermore, in one or more embodiments described below, terms that are used in the existing LTE are used, such as SS (Synchronization signal), PSS (Primary SS), SSS (Secondary SS), PBCH (Physical broadcast channel), PRACH (Physical random access channel), PDCCH (Physical Downlink Control Channel), PDSCH (Physical Downlink Shared Channel), PUCCH (Physical Uplink Control Channel), PUSCH (Physical Uplink Shared Channel), etc. The above-described terms are used for the sake of description convenience. Signals, functions, etc., which are similar to the above-described terms, may be referred to as different names. Further, the above terms in NR correspond to NR-SS, NR-PSS, NR-SSS, NR-PBCH, NR-PRACH, NR-PDCCH, NR-PDSCH, NR-PUCCH, NR-PUSCH, and the like. However, even when a signal is used for NR, there may be a case in which the signal is not referred to as "NR-".

Furthermore, in an embodiment of the present invention, the duplex method may be TDD (Time Division Duplex), FDD (Frequency Division Duplex), or other methods (e.g., Flexible Duplex, or the like).

Further, in an embodiment of the present invention, the expression, radio (wireless) parameters are "configured (set)" may mean that a predetermined value is pre-configured, or may mean that a radio parameter indicated by the base station 10 or by the terminal 20 is configured.

Figure 1:
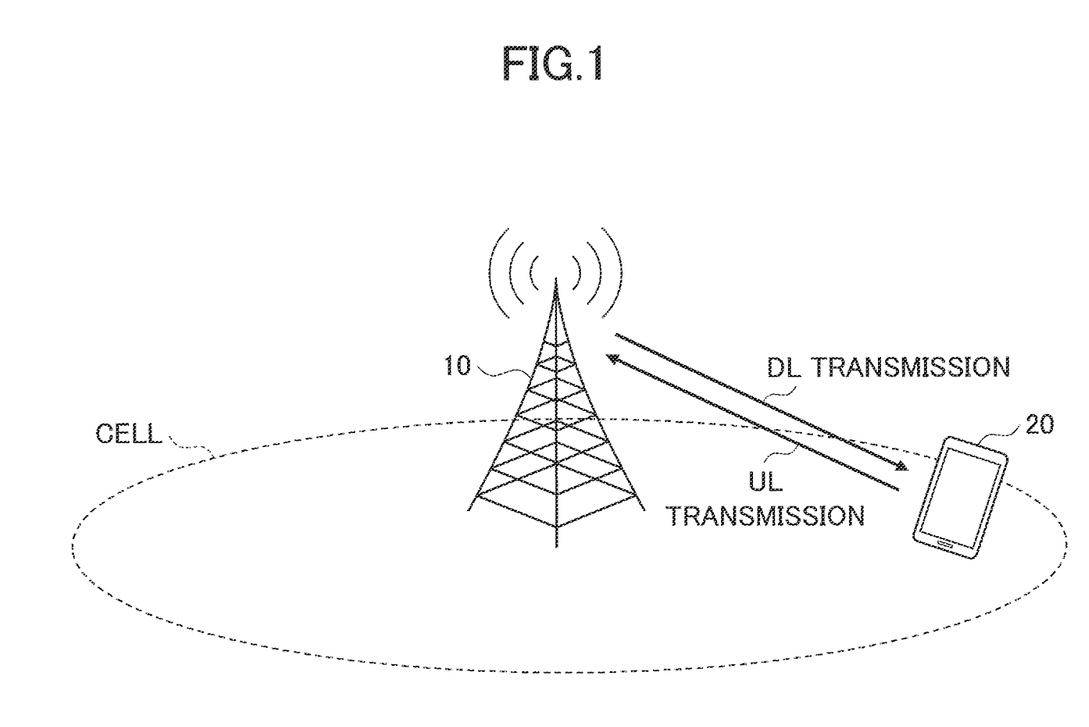
FIG. 1 is a drawing illustrating a configuration example (1) of a wireless communication system according to an embodiment of the present invention.

FIG. 1 is a drawing illustrating a configuration example (1) of a wireless communication system according to an embodiment of the present invention. As illustrated in FIG. 1, a base station 10 and a terminal 20 are included. In FIG. 1, a single base station 10 and a single terminal 20 are illustrated as an example. There may be a plurality of base stations 10 and a plurality of terminals 20. Note that the terminal 20 may be referred to as a "user apparatus". Further, the wireless communication system according to an embodiment of the present invention may be referred to as an NR-U system.

The base station 10 is a communication apparatus that provides one or more cells and performs wireless communications with the terminal 20. Physical resources of a radio signal may be defined in a time domain and a frequency domain, the time domain may be defined by slots or OFDM symbols, and the frequency domain may be defined by sub-bands, sub-carriers, or resource blocks.

As shown in FIG. 1, the base station 10 transmits control information or data in DL (Downlink) to the terminal 20 and receives control information or data in UL (Uplink) from the terminal 20. The base station 10 and terminal 20 are capable of transmitting and receiving a signal by performing the beamforming. Further, the base station 10 and the terminal 20 can both apply MIMO (Multiple Input Multiple Output) communication to DL or UL. Further, both the base station 10 and terminal 20 may perform communications via an SCell (Secondary Cell) and a PCell (Primary Cell) using CA (Carrier Aggregation).

The terminal 20 may be a communication apparatus that includes a wireless communication function such as a smartphone, a mobile phone, a tablet, a wearable terminal, a communication module for M2M (Machine-to-Machine), or the like. As shown in FIG. 1, the terminal 20 uses various communication services provided by the wireless communication system by receiving control information or data in DL from the base station 10 and transmitting control information or data in UL to the base station 10.

Figure 2:
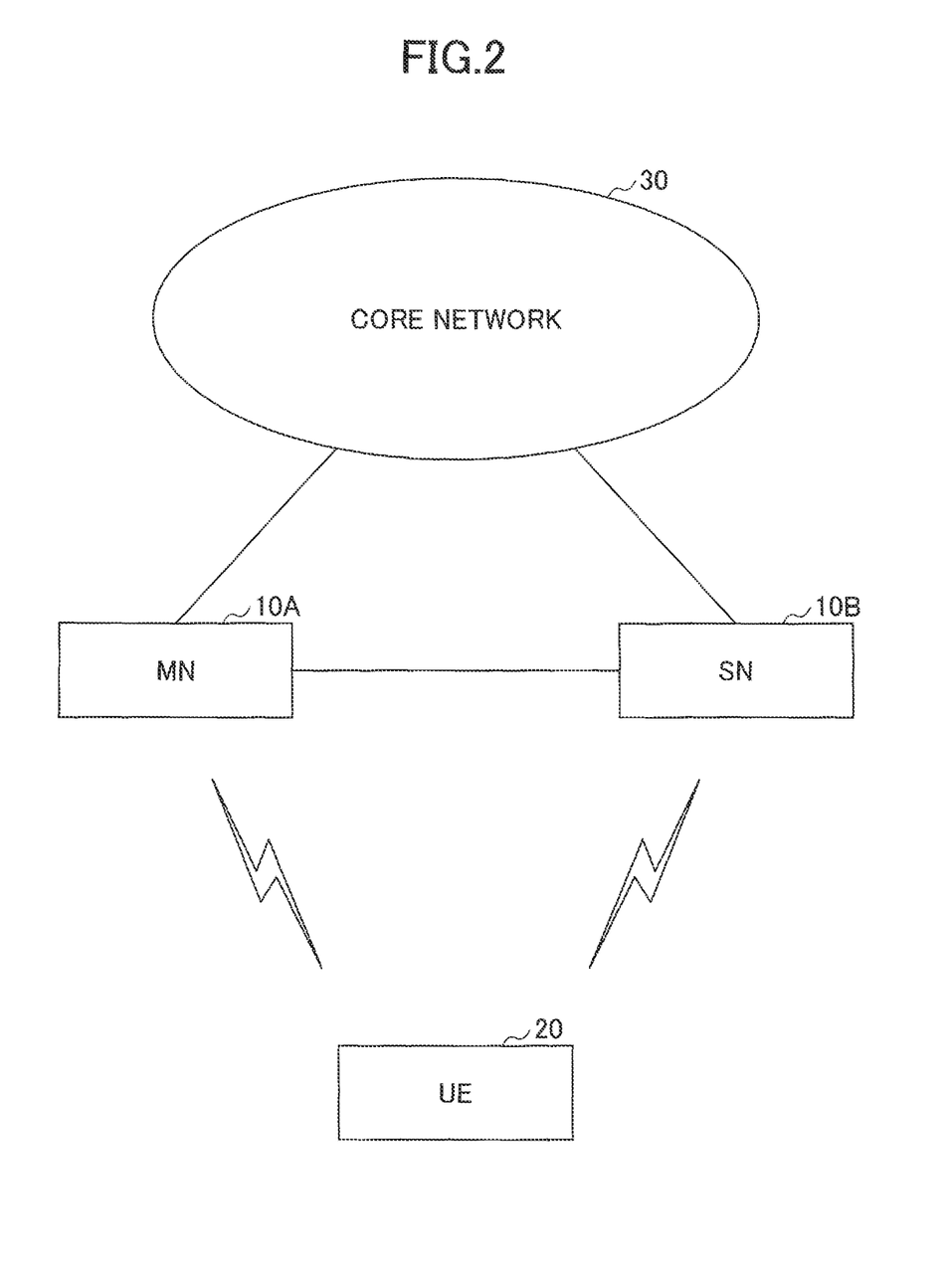
FIG. 2 is a drawing illustrating a configuration example (2) of a wireless communication system according to an embodiment of the present invention.

FIG. 2 is a drawing illustrating a configuration example (2) of a wireless communication system according to an embodiment of the present invention. FIG. 2 shows an example of a configuration of a wireless communication system when NR-DC (NR-Dual connectivity) is performed. As shown in FIG. 2, a base station 10A serving as an MN (Master Node) and a base station 10B serving as an SN (Secondary Node) are provided. The base station 10A and the base station 10B are each connected to a core network 30. The terminal 20 communicates with both the base station 10A and the base station 10B.

A cell group provided by the base station 10A that is an MN is called an MCG (Master Cell Group), and a cell group provided by the base station 10B that is an SN is called an SCG (Secondary Cell Group). Operations described below may be performed in any of the configurations of FIG. 1 and FIG. 2.

Discussions of Beyond 5G and 6G as a system after 5G have been started. The expansion of a new frequency band has been discussed as a candidate of discussion issue for Beyond 5G and 6G. For example, the new frequency band is a frequency band above 52.6 GHz, a terahertz band, and the like.

Figure 3:
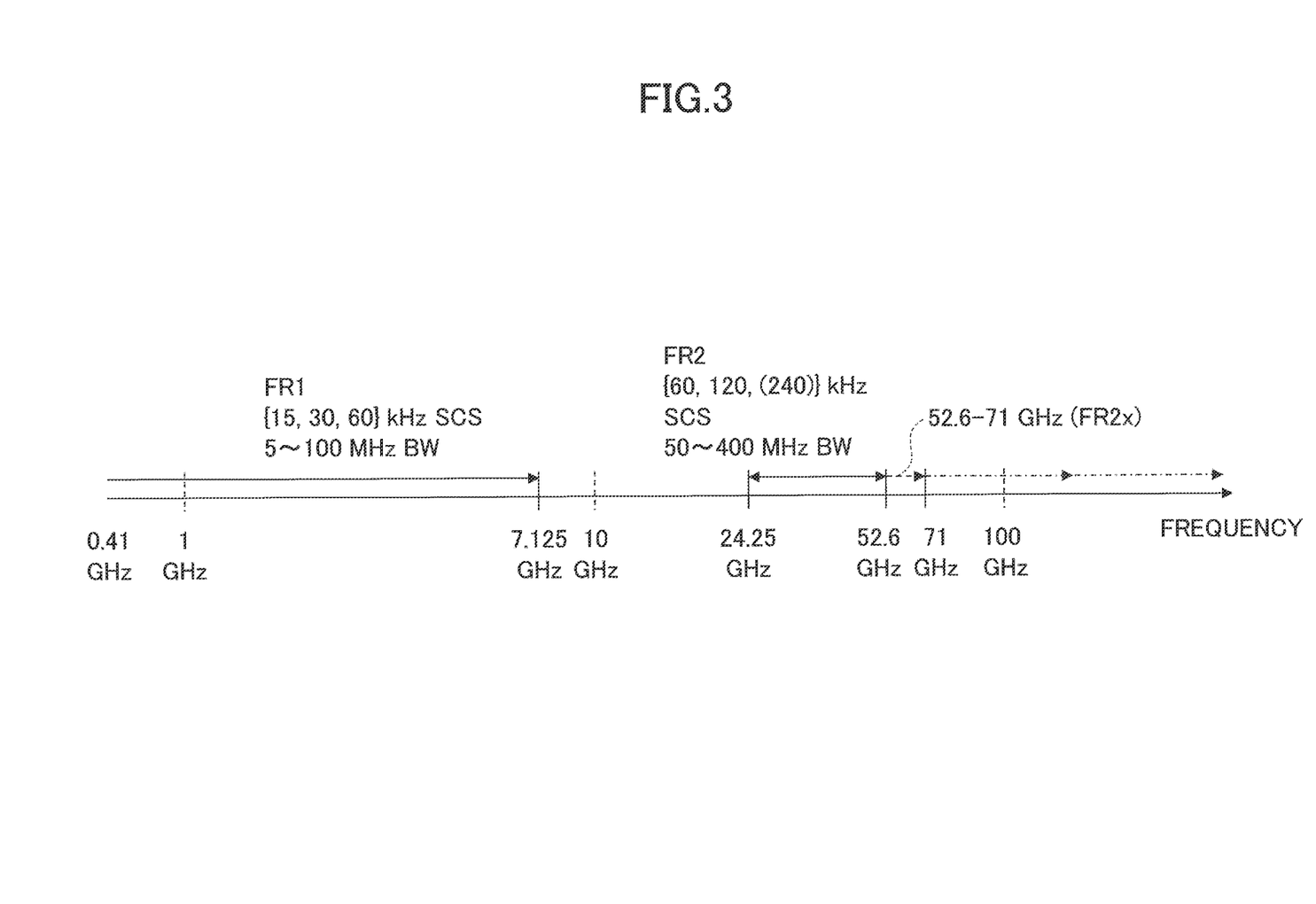
FIG. 3 is a drawing illustrating an example of a frequency band according to an embodiment of the present invention.

FIG. 3 is a drawing illustrating an example of a frequency band according to an embodiment of the present invention. As shown in FIG. 3, FR1 is defined as a frequency band up to 7.125 GHz with a sub-carrier spacing of {15, 30, 60}kHz and a bandwidth of 5-100 MHz. Also, as shown in FIG. 3, FR2 is defined as a frequency band with a sub-carrier spacing of {60, 120, 240}kHz, 50-400 MHz bandwidth, from 24.25 to 52.6 GHz. Also, as shown in FIG. 3, a frequency band 52.6-71 GHz may be separated from FR2 and referred to as "FR2x" or the like as a new Frequency Range (FR), or the current definition of FR2 (a frequency band from 24.25 GHz to 52.6 GHz) may be changed and the frequency band 52.6-71 GHz may be included in the changed FR2.

Supporting the 52.6-71 GHz frequency band shown in FIG. 3 is discussed in NR release 17. In addition, frequency usages, use cases, and requirement technical specifications of each country regarding 52.6-114.25 Ghz have been discussed in NR release 16. Therefore, the support may be extended to about 114 GHz in NR release 18 or beyond.

For example, with respect to frequency bands above 52.6-71 GHz, applying a new numerology or applying a new value of operating subcarrier spacing is being discussed. In addition, technical elements that need to be adapted to the new numerology include, for example, BWP (Bandwidth part), beam switching time, HARQ (Hybrid automatic repeat request) scheduling, and UE processing time required for each of PDSCH, PUSCH, SRS (Sounding reference signal), and CSI (Channel state information). In addition, support of up to 64 SSB (SS/PBCH block) beams is being discussed for licensed and unlicensed operations in the above-described frequency band.

In addition, with respect to channel access mechanisms in the 52.6-71 GHz frequency band, application of regulatory requirements in the unlicensed frequency band of 52.6-71 GHz, and beam-based operations, are assumed.

The channel access mechanism is required, for example, in some countries or regions for operation of the unlicensed frequency band of 57-71 Ghz (e.g., Non-Patent Document 3). Table 1 shows examples of requirements in Europe.

TABLE 1

| Frequency band (GHz) | Power/ Magnetic Field Requirements | Spectrum access and mitigation requirements | Modulation/ Maximum occupied bandwidth | Purpose/Node Placement requirements | Notes |
|---|---|---|---|---|---|
| 57-66 | 40 dBm mean EIRP. This refers to | Adequate spectrum sharing | Not specified | Short Rage Devices - Wide Data | Fixed outdoor installations are not allowed. |

TABLE 1-continued

| Frequency band (GHz) | Power/ Magnetic Field Requirements | Spectrum access and mitigation requirements | Modulation/ Maximum occupied bandwidth | Purpose/Node Placement requirements | Notes |
|---|---|---|---|---|---|
| | the highest power level of the transmitter power control range during the transmission burst if transmitter power control is implemented | mechanism (e.g. Listen-before-Talk, Detect-And-Avoid) shall be implemented by the equipment | | Transmissions [42] | The maximum mean EIRP density is limited to 13 dBm/MHz. Point-to-point links of the Fixed Service are regulated by [46] [47] |

As shown in Table 1, sufficient spectral sharing mechanisms, e.g., LBT, Detect-And-Avoid, and the like, need to be implemented in the device as spectrum access and mitigation requirements.

Table 2 shows examples of requirements in Japan.

TABLE 2

| Frequency band (GHz) | Power/ Magnetic Field Requirements | Spectrum access and mitigation requirements | Modulation/ Maximum occupied bandwidth | Purpose/Node Placement requirements | Notes |
|---|---|---|---|---|---|
| 57-66 | Power below 250 mW | The carrier sensing functionality is required for transmission power above 10 dBm. | Occupied BW shall be below 9 GHz | For Unlicensed low power data Communication systems | ARIB STD-T69 [18], ARIB STD-T117 [19] See Note 4 for additional regulatory requirements. |

As shown in Table 2, carrier sensing functions are required for transmit power exceeding 10 dBm as the spectrum access and mitigation requirements.

Release 16 NR-U defines a channel access mechanism in the 5-6 GHz band. The channel access mechanism is specifically designed for efficient coexistence with a wireless LAN (Local Area Network).

On the other hand, the 52.6-71 GHz system of Release 17 NR is assumed to coexist with broadband systems such as, for example, IEEE 802.11ad with a bandwidth exceeding 2 GHz. Table 3 shows examples of technical specifications of the broadband system.

TABLE 3

| Channel | Center (GHz) | Min. (GHz) | Max. (GHz) | BW (GHz) |
|---|---|---|---|---|
| 1 | 58.32 | 57.24 | 59.40 | 2.16 |
| 2 | 60.48 | 59.40 | 61.56 | |
| 3 | 62.64 | 61.56 | 63.72 | |
| 4 | 64.80 | 63.72 | 65.88 | |
| 5 | 66.96 | 65.88 | 68.04 | |
| 6 | 69.12 | 68.04 | 70.20 | |

As shown in Table 3, the broadband system has a channel bandwidth of 2.16 GHz and a central frequency near 60 GHz. The system and conventional wireless LANs differ in system design and channel access mechanisms.

Therefore, the channel access mechanism of release 16 NR may not be suitable for the NR 52.6-71 GHz system. For example, the LBT bandwidth of the release 16 NR is 20 MHz because the channel bandwidth of conventional wireless LANs is 20 MHz, or an integer multiple of 20 MHz. However, because the channel bandwidth of IEEE 802.11ad is 2.16 GHz, the LBT bandwidth of 20 MHz may be too narrow for NR 52.6-71 GHz systems. In addition, it is necessary to consider that the NR 52.6-71 GHz system is a beam-based operation. Note that, hereinafter, the term "LBT" may be replaced by "channel access procedure", "sensing", or the like.

Thus, a channel access mechanism different from the 5 GHz or 6 GHz band may be applied to NR's 52.6 GHz or higher unlicensed frequency bands (e.g., 59-64 GHz, 57-66 GHz, 57-64 GHz, 57-71 GHz).

Figure 4:
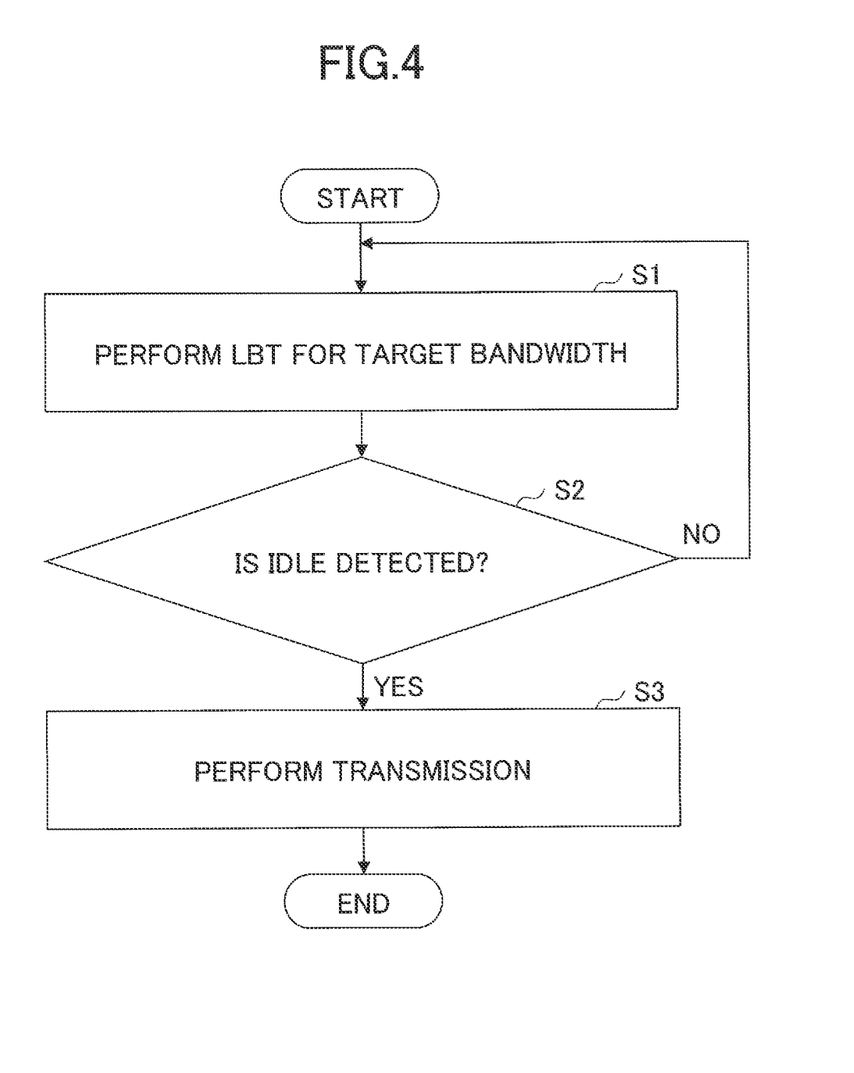
FIG. 4 is a flowchart illustrating an example of transmission by LBT according to an embodiment of the present invention.

FIG. 4 is a flowchart illustrating an example of transmission by LBT according to an embodiment of the present invention. In step S1, the terminal 20 performs LBT with a target bandwidth. The LBT may include a random back-off operation by the contention window. Subsequently, the terminal 20 determines whether idle is detected. If idle is detected (YES in S2), then the process proceeds to step S3, and if no idle is detected (NO in S2), then the process may return to step S1 or terminate without transmission. In step S3, the terminal 20 performs transmission.

Figure 5:
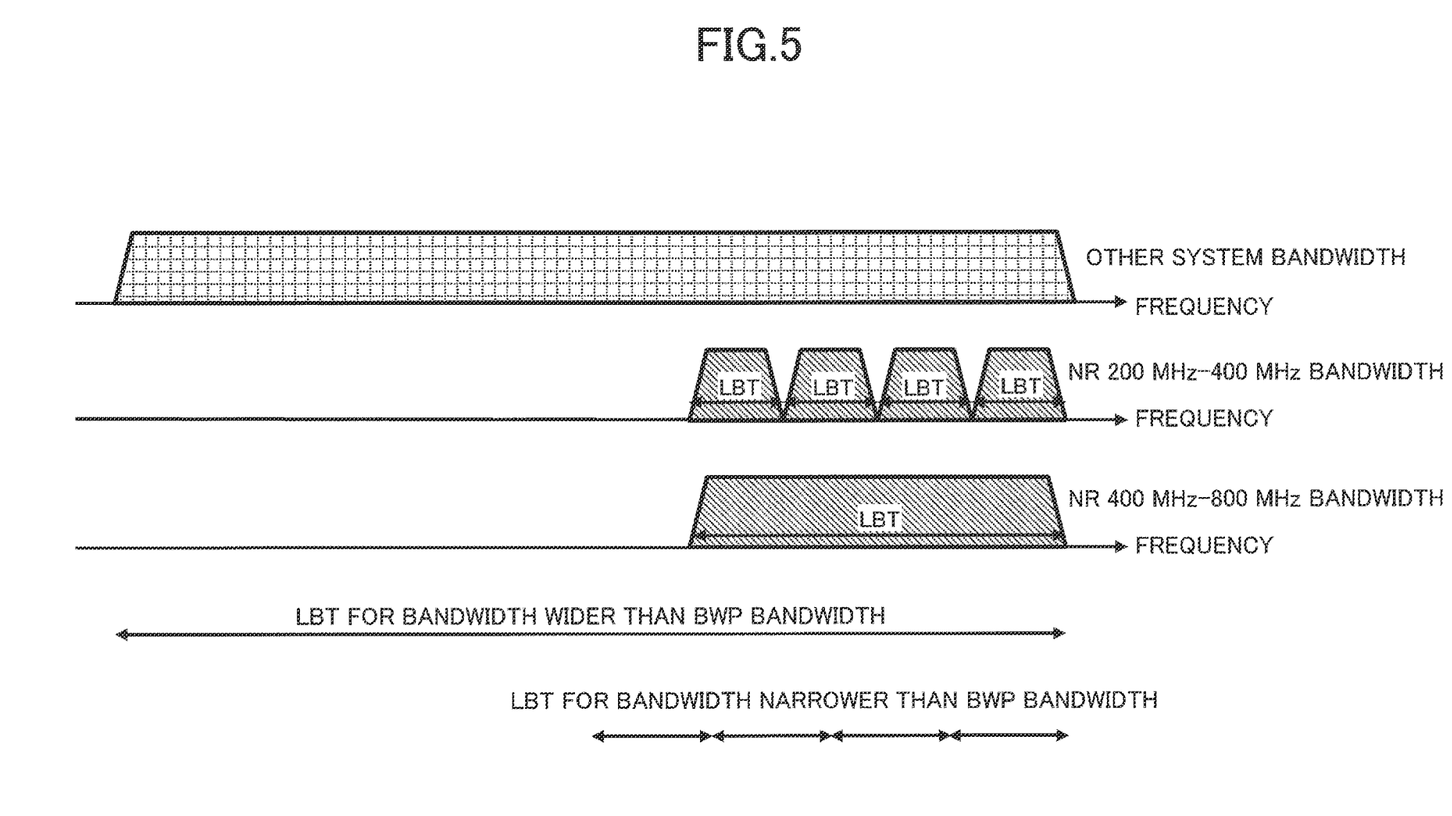
FIG. 5 is a drawing illustrating an example of an LBT bandwidth according to an embodiment of the present invention.

FIG. 5 is a drawing illustrating an example of an LBT bandwidth according to an embodiment of the present invention. For example, unless instructed or configured by the base station 10, the terminal 20 may assume any of the following 1)-5) of the LBT target bandwidth.
1) BWP bandwidth
2) Channel bandwidth
3) Minimum channel bandwidth in the band
4) Minimum bandwidth in 1)-3) above
5) Maximum bandwidth in 1)-3) above Further, the LBT bandwidth in the 52.6-71 GHz band may be at least greater than 20 MHz in the 5/6 GHz band. For example, as shown in FIG. 5, LBT may be performed with a bandwidth of 200 MHz to 400 MHz, LBT may be performed with a bandwidth of 400 MHz to 800 MHz, LBT may be performed with a bandwidth of 2.16 GHz, or LBT may be performed with a bandwidth wider or narrower than the BWP bandwidth.

Further, the base station 10 may be capable of configuring the target bandwidth of LBT. For example, as shown in FIG. 5, the LBT bandwidth may be wider than the BWP bandwidth, may be the same bandwidth as the channel bandwidth, or may be the same bandwidth as the minimum channel bandwidth in the band of interest (e.g., narrower than the BWP bandwidth). In addition, the base station 10 may configure a plurality of LBT bands within the BWP or within a predetermined band. When the base station 10 configures a plurality of LBT bands, the base station 10 may configure a guard band, in which resource allocation is not possible, between the LBT bands, or the base station 10 may configure the plurality of LBT bands without a guard band.

Note that the channel bandwidth may be, for example, 50 MHz, 100 MHz, 200 MHz, or 400 MHz. The minimum channel bandwidth in a band is, for example, 50 MHz, if 50 MHz, 100 MHz, 200 MHz, or 400 MHz can be configured for the band.

Here, an ED (Energy Detection) threshold may be proportional to the LBT bandwidth. For example, if the bandwidth of other coexisting systems is 2.16 GHz, and the LBT bandwidth is 2.16 GHz, then the ED threshold may be the same as that of other systems. Also, for example, if the LBT bandwidth is 1/X of the reference, the ED threshold may be 1/X of the reference. Note that the ED threshold may not be proportional to the LBT bandwidth, but may be based on the LBT bandwidth. For example, a predetermined value may be added to or subtracted from a value proportional to the LBT bandwidth.

A sensing slot period and/or an extended period in the 52.6 GHz or higher frequency band may differ from those in the 5/6 GHz band. For example, the sensing slot period and/or the extended period in a frequency band of 52.6 GHz or greater may be less than 9 microseconds, or equal to a symbol length or an integer multiple of the symbol length.

Also, the type 1 channel access contention window size (e.g., maximum contention window size) in the 52.6 GHz or higher frequency band may be different from the 5/6 GHz band contention window size. Table 4 shows an example of a 5/6 GHz band content window size (e.g., Non-Patent Document 4).

TABLE 4

| Channel access priority class (p) | $m_p$ | $CW_{min,p}$ | $CW_{max,p}$ | $T_{mcot,p}$ | allowed $CW_p$ size |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

$m_p$ shown in Table 4 is the number of sensing slots, $CW_{min,p}$ is the minimum value of the contention window size, $CW_{max,p}$ is the maximum value of the contention window size, $T_{mcot,p}$ is the channel occupancy time, and $CW_p$ is the contention window size. For frequency bands above 52.6 GHz, at least one of 1)-6) may be applied, for example. Note that $m_p$ may be the number of sensing symbols.

1) smaller $m_p$ value
2) smaller $CW_{min,p}$ value
3) smaller $CW_{max,p}$ value
4) smaller number of $CW_p$ value
5) smaller number of p, i.e., the number of channel access priority classes
6) longer $T_{mcot,p}$ value Further, the sensing interval/gap of channel access type 2A/2B/2C in the frequency band of 52.6 GHz or higher may be different from that of 5/6 GHz channel access type 2A/2B/2C. For example, the sensing interval/gap may be shorter than the sensing interval/gap in other frequency bands (e.g., 16 microseconds or 25 microseconds) or equal to a symbol length or an integer multiple of the symbol length.

Because systems using high frequencies have high sampling rates in order to control a wide bandwidth, LBT can be performed with a short gap period as described above. A short LBT gap has an effect of reducing overhead associated with the LBT.

Moreover, the application of narrow coverage due to high frequencies and beam-forming transmission reduces the likelihood of detecting collisions. Thus, the contention window size can be shortened without significantly increasing the likelihood of transmission collisions. A short contention window size has an effect of reducing the LBT overhead.

In addition, the NR ED threshold may be too low for LBT to coexist with systems such as IEEE 802.11ad, which differs significantly in bandwidth compared to NR. For example, if the ED threshold is used in a case where the IEEE 802.11ad system is not installed in the communication area, then the LBT operation may become inefficient.

Thus, for an NR 52.6 GHz or greater unlicensed frequency band (e.g., 59-64 GHz, 57-66 GHz, 57-64 GHz, 57-71 Ghz), LBT, in which a preamble is used for detection, may be performed for detecting a case of NR and NR coexistence.

A common preamble may be used or defined in NR systems. For example, a preamble to be used may be selected from a set of preambles for identifying operators. That is, the terminal 20 may be capable of identifying an NR operator by detecting a preamble. Note that the set of preambles (candidate set) for identifying operators may be configured based on configuration information (e.g., RRC signaling) received from the base station 10. In addition, selection of a preamble from the candidate set may be based on instruction information received from the base station 10.

The preamble may be a reference signal or the like of existing NR. For example, a signal of any of PSS, SSS, CSI-RS, PBCH-DM-RS, SRS and PRACH may be used for a preamble, and a combination of these signals may be used for a preamble. Alternatively, the preamble may be a new signal different from existing NR reference signals.

The configurations of preamble detection and preamble transmission may be changeable. For example, preamble detection may be performed for each configured bandwidth that is different from the ED-based LBT bandwidth. For example, when the ED-based LBT bandwidth is executed for a wider band than the NR channel bandwidth, the PD (Preamble Detection)-based LBT bandwidth may be executed for each NR channel bandwidth.

In a case where PSS and/or SSS is used as a preamble for PD-based LBT, the preamble may be transmitted for each bandwidth with which PD-based LBT is performed. For example, the preamble may be transmitted for each minimum channel bandwidth. Further, operation of 1)-3) may be performed.

1) The location of the frequency domain of PSS and/or SSS RB (resource block) for each channel bandwidth may be indicated to the terminal 20 from the base station 10.
2) The location of the frequency domain of PSS and/or SSS RB for each channel bandwidth may be predefined in the technical specifications. For example, the location may be the center of the channel bandwidth, the lower end or lower portion of the band, or the upper end or upper portion of the band.
3) PSS and/or SSS may be transmitted repeatedly in the frequency domain within each channel bandwidth. Note that the number of repetitions or the transmission period may be configured based on the configuration information received from the base station 10.

Further, for example, broadband transmission may be assumed as a preamble for LBT. For example, the broadband transmission may be a transmission that uses the entire bandwidth of each channel or each minimal channel. Alternatively, the bandwidth actually transmitted may be configurable.

In a case where PD-based LBT is performed in multiple LBT bandwidths and a preamble is detected in at least one LBT bandwidth, transmission in all LBT bandwidths may be un-permitted (prohibited). Alternatively, transmission may be permitted in LBT bandwidths, except for the LBT bandwidth in which the preamble is detected.

By performing detection for system coexistence using a preamble as described above, the detection probability at the time of a collision can be increased and efficient LBT operation can be performed even when the ED threshold is lower than conventional ones.

In addition, for an NR 52.6 GHz or greater unlicensed frequency band (e.g., 59-64 GHz, 57-66 GHz, 57-64 GHz, 57-71 GHz), LBT may be performed in all antenna ports used for transmission.

For example, LBT may be performed for each antenna port. If no collision is detected by LBT in all antenna ports, transmission may be permitted.

Further, for example, LBT may be performed for each set of antenna ports. For example, LBT may be performed assuming a beam. For example, LBT may be performed for transmission to which beam forming using the same antenna coefficients is applied.

Further, for example, LBT may be performed, for multiple sets of antenna coefficients, for each of the sets as in beam sweeping.

The above "antenna coefficients" may be replaced by "spatial filters". For example, LBT may be performed for transmission using the same spatial filter. Alternatively, the above "antenna coefficients" may be replaced by "QCL (Quasi-Co-Location) assumption". For example, LBT may be performed for transmission with the same QCL assumption.

The above-described LBT performed for each set of the antenna ports may be permitted in a case where the terminal 20 or base station 10 supports beam correspondence. That is, support of beam correspondence is defined as mandatory for LBT for each set of antenna ports. Alternatively, it may be defined as mandatory for all base stations 10 and terminals 20 to support beam correspondence, for example, in a frequency band above 52.6 GHz.

Note that the "52.6-71 GHz band" and the "frequency band above 52.6 GHz" in the above-described embodiments are examples, and the above-described embodiments may be applied in the higher or lower frequency band.

According to the above-described embodiments, the terminal 20 can improve communication efficiency by performing LBT adapted to a system that uses a higher frequency or wider frequency band than in the conventional technologies in a case of coexistence with the system.

That is, in a wireless communication system, LBT (Listen before talk) adapted to a coexisting wireless communication system can be performed.

Functional Structure

Next, a functional configuration example of the base station 10 and the terminal 20 for performing the processes and operations described above will be described. The base station 10 and terminal 20 include functions for implementing the embodiments described above. It should be noted, however, that each of the base stations 10 and the terminal 20 may include only some of the functions in an embodiment.

Base Station 10

Figure 6:
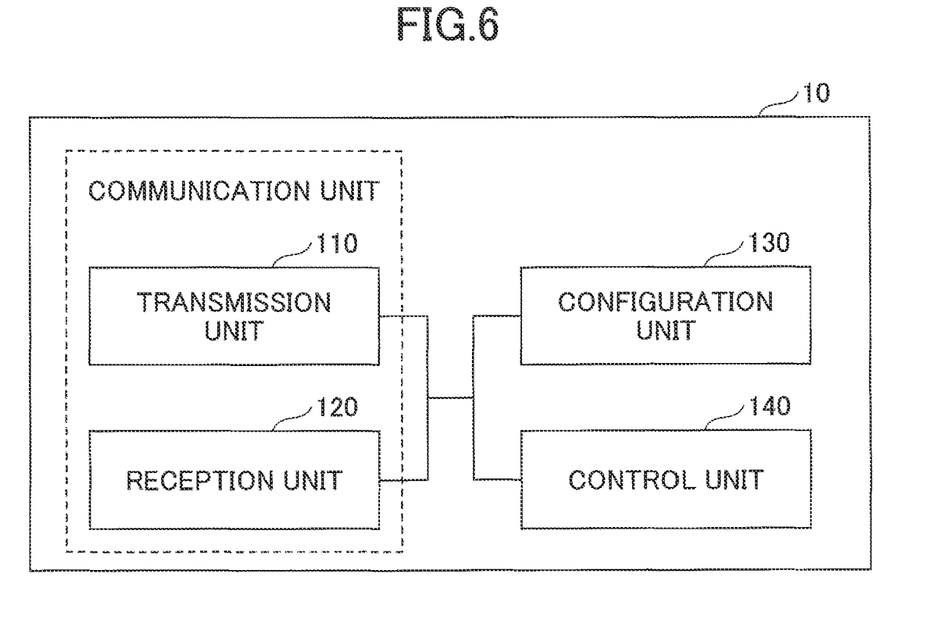
FIG. 6 is a drawing illustrating an example of a functional structure of a base station 10 according to an embodiment of the present invention.

FIG. 6 is a drawing illustrating an example of a functional structure of a base station 10 according to an embodiment of the present invention. As shown in FIG. 6, the base station 10 includes a transmission unit 110, a reception unit 120, a configuration unit 130, and a control unit 140. The functional structure illustrated in FIG. 6 is merely an example. Functional divisions and names of functional units may be anything as long as it can perform operations according to an embodiment of the present invention.

The transmission unit 110 includes a function for generating a signal to be transmitted to the terminal 20 side and transmitting the signal wirelessly. Further, the transmission unit 110 transmits an inter-network-node message to another network node. The reception unit 120 includes a function for receiving various signals transmitted from the terminal 20 and acquiring, for example, information of a higher layer from the received signals. Further, the transmission unit 110 has a function to transmit NR-PSS, NR-SSS, NR-PBCH, DL/UL control signals and reference signals, and the like to the terminal 20. Further, the reception unit 120 receives an inter-network-node message from another network node. The transmission unit 110 and the reception unit 120 may be combined as a communication unit.

The configuration unit 130 stores preset configuration information and various configuration information items to be transmitted to the terminal 20 in a storage apparatus and reads the preset configuration information from the storage apparatus if necessary. Contents of the configuration information are, for example, information required for LBT.

The control unit 140 performs control related to LBT as described in the embodiments. The functional units related to signal transmission in the control unit 140 may be included in the transmission unit 110, and the functional units related to signal reception in the control unit 140 may be included in the reception unit 120.

Terminal 20

Figure 7:
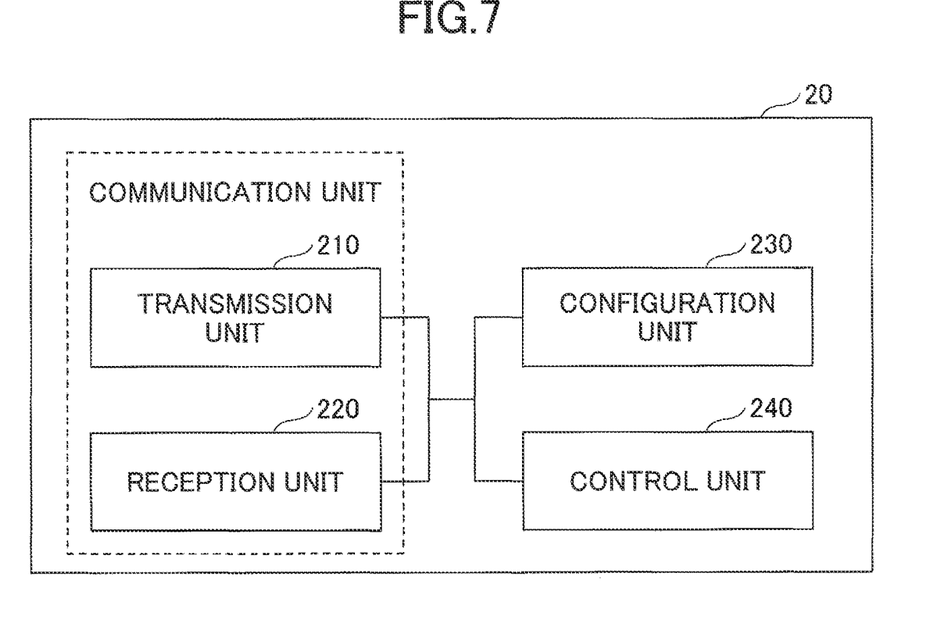
FIG. 7 is a drawing illustrating an example of a functional structure of a terminal 20 according to an embodiment of the present invention.

FIG. 7 is a drawing illustrating an example of a functional structure of a terminal 20 according to an embodiment of the present invention. As shown in FIG. 7, the terminal 20 includes a transmission unit 210, a reception unit 220, a configuration unit 230, and a control unit 240. The functional structure illustrated in FIG. 7 is merely an example. Functional divisions and names of functional units may be anything as long as it can perform operations according to an embodiment of the present invention.

The transmission unit 210 has a function for generating a transmission signal from transmission data and transmitting the transmission signal wirelessly. The reception unit 220 receives various signals wirelessly and obtains upper layer signals from the received physical layer signals. Further, the reception unit 220 has a function for receiving NR-PSS, NR-SSS, NR-PBCH, DL/UL/SL control signals, etc., transmitted from the base station 10. Further, for example, with respect to the D2D communications, the transmission unit transmits, to another terminal 20, PSCCH (Physical Sidelink Control Channel), PSSCH (Physical Sidelink Shared Channel), PSDCH (Physical Sidelink Discovery Channel), PSBCH (Physical Sidelink Broadcast Channel), etc., and the reception unit 220 receives, from the another terminal 20, PSCCH, PSSCH, PSDCH, or PSBCH. The transmission unit 210 and the reception unit 220 may be combined as a communication unit.

The configuration unit 230 stores various configuration information received from the base station 10 or the terminal 20 by the receiving unit 220 in the storage apparatus and reads them from the storage apparatus as necessary. Further, the configuration unit 230 stores preset configuration information. Contents of the configuration information are, for example, information required for LBT.

The control unit 240 performs control related to LBT as described in the embodiments. The functional units related to signal transmission in the control unit 240 may be included in the transmission unit 210, and the functional units related to signal reception in the control unit 240 may be included in the reception unit 220.

Hardware Structure

In the above functional structure diagrams used for describing an embodiment of the present invention (FIG. 6 and FIG. 7), functional unit blocks are shown. The functional blocks (function units) are realized by a freely-selected combination of hardware and/or software. Further, realizing means of each functional block is not limited in particular. In other words, each functional block may be realized by a single apparatus in which multiple elements are coupled physically and/or logically, or may be realized by two or more apparatuses that are physically and/or logically separated and are physically and/or logically connected (e.g., wired and/or wireless). The functional blocks may be realized by combining the above-described one or more apparatuses with software.

Functions include, but are not limited to, judging, determining, calculating, processing, deriving, investigating, searching, checking, receiving, transmitting, outputting, accessing, resolving, selecting, establishing, comparing, assuming, expecting, and deeming; broadcasting, notifying, communicating, forwarding, configuring, reconfiguring, allocating, mapping, and assigning, etc. For example, a functional block (component) that functions to transmit is called a transmitting unit or a transmitter. In either case, as described above, the implementation method is not particularly limited.

Figure 8:
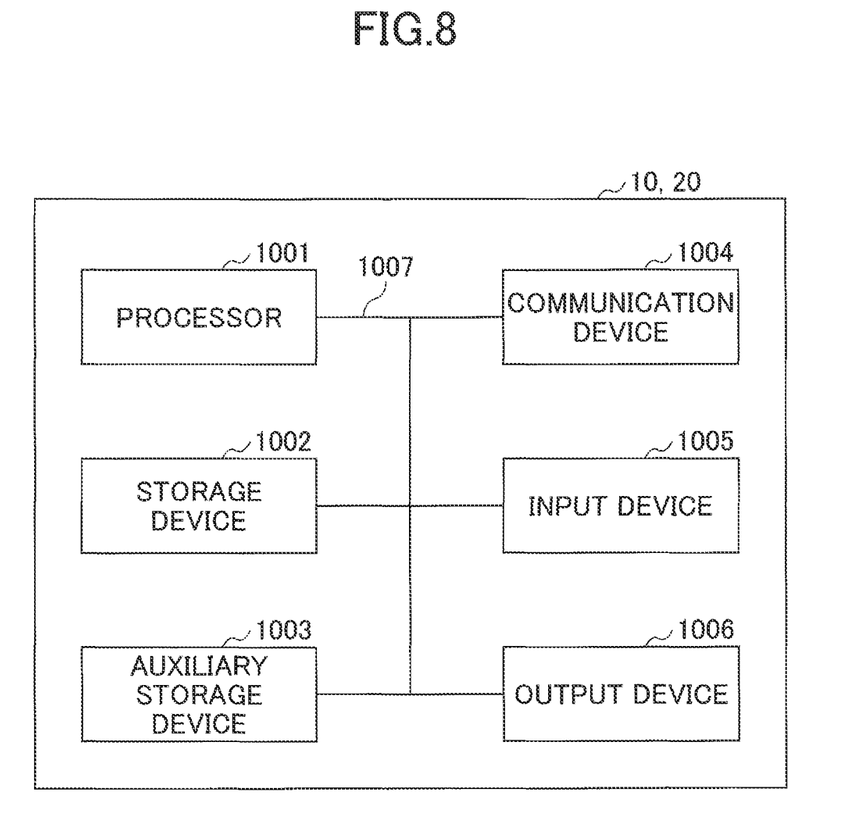
FIG. 8 is a drawing illustrating examples of hardware structures of a base station 10 or terminal 20 according to an embodiment of the present invention.

For example, the base station 10, terminal 20, etc., according to an embodiment of the present disclosure may function as a computer for processing the radio communication method of the present disclosure. FIG. 8 is a drawing illustrating an example of hardware structures of the base station 10 and terminal 20 according to an embodiment of the present invention. Each of the above-described base station 10 and the terminal 20 may be physically a computer device including a processor 1001, a storage device 1002, an auxiliary storage device 1003, a communication device 1004, an input device 1005, an output device 1006, a bus 1007, etc.

It should be noted that, in the descriptions below, the term "apparatus" can be read as a circuit, a device, a unit, etc. The hardware structures of the base station 10 and terminal 20 may include one or more of each of the devices illustrated in the figure, or may not include some devices.

Each function in the base station 10 and terminal 20 is realized by having the processor 1001 perform an operation by reading predetermined software (programs) onto hardware such as the processor 1001 and the storage device 1002, and by controlling communication by the communication device 1004 and controlling at least one of reading and writing of data in the storage device 1002 and the auxiliary storage device 1003.

The processor 1001 controls the entire computer by, for example, controlling the operating system. The processor 1001 may include a central processing unit (CPU) including an interface with a peripheral apparatus, a control apparatus, a calculation apparatus, a register, etc. For example, the above-described control unit 140, control unit 240, and the like, may be implemented by the processor 1001.

Further, the processor 1001 reads a program (program code), a software module, or data from the auxiliary storage device 1003 and/or the communication device 1004, and performs various processes according to the program, the software module, or the data. As the program, a program is used that causes the computer to perform at least a part of operations according to an embodiment of the present invention described above. For example, the control unit 140 of the base station 10 illustrated in FIG. 6 may be realized by control programs that are stored in the storage device 1002 and are executed by the processor 1001. Further, for example, the control unit 240 of the terminal 20 illustrated in FIG. 7 may be realized by control programs that are stored in the storage device 1002 and are executed by the processor 1001. The various processes have been described to be performed by a single processor 1001. However, the processes may be performed by two or more processors 1001 simultaneously or sequentially. The processor 1001 may be implemented by one or more chips. It should be noted that the program may be transmitted from a network via a telecommunication line.

The storage device 1002 is a computer-readable recording medium, and may include at least one of a ROM (Read Only Memory), an EPROM (Erasable Programmable ROM), an EEPROM (Electrically Erasable Programmable ROM), a RAM (Random Access Memory), etc. The storage device 1002 may be referred to as a register, a cache, a main memory, etc. The storage device 1002 is capable of storing programs (program codes), software modules, or the like, that are executable for performing communication processes according to an embodiment of the present invention.

The auxiliary storage device 1003 is a computer-readable recording medium, and may include at least one of, for example, an optical disk such as a CD-ROM (Compact Disc ROM), a hard disk drive, a flexible disk, a magneto optical disk (e.g., compact disk, digital versatile disk, Blu-ray (registered trademark) disk), a smart card, a flash memory (e.g., card, stick, key drive), a floppy (registered trademark) disk, a magnetic strip, etc. The above recording medium may be a database including the storage device 1002 and/or the auxiliary storage device 1003, a server, or any other appropriate medium.

The communication device 1004 is hardware (transmission and reception device) for communicating with computers via at least one of a wired network and a wireless network, and may be referred to as a network device, a network controller, a network card, a communication module, etc. The communication device 1004 may comprise a high frequency switch, duplexer, filter, frequency synthesizer, or the like, for example, to implement at least one of a frequency division duplex (FDD) and a time division duplex (TDD). For example, the transmitting/receiving antenna, the amplifier unit, the transmitting/receiving unit, the transmission line interface, and the like, may be implemented by the communication device 1004. The transmitting/receiving unit may be physically or logically divided into a transmitting unit and a receiving unit.

The input device 1005 is an input device that receives an external input (e.g., keyboard, mouse, microphone, switch, button, sensor). The output device 1006 is an output device that outputs something to the outside (e.g., display, speaker, LED lamp). It should be noted that the input device 1005 and the output device 1006 may be integrated into a single device (e.g., touch panel).

Further, the apparatuses including the processor 1001, the storage device 1002, etc., are connected to each other via the bus 1007 used for communicating information. The bus 1007 may include a single bus, or may include different buses between the apparatuses.

Further, each of the base station 10 and terminal 20 may include hardware such as a micro processor, a digital signal processor (DSP), an ASIC (Application Specific Integrated Circuit), a PLD (Programmable Logic Device), a FPGA (Field Programmable Gate Array), etc., and a part or all of each functional block may be realized by the hardware. For example, the processor 1001 may be implemented by at least one of the above hardware elements.

Embodiment Summary

As described above, according to an embodiment of the present invention, a terminal is provided that includes a control unit configured to perform LBT (Listen before talk) in a frequency band above a predetermined frequency, and a transmission unit configured to transmit a signal based on a result of the LBT, wherein the control unit performs the LBT with a mechanism different from LBT performed in a frequency band below the predetermined frequency.

According to the above-described arrangement, the terminal 20 can improve communication efficiency by performing LBT adapted to a system that uses a higher frequency or wider frequency band than in the conventional technologies in a case of coexistence with the system. That is, in a wireless communication system, LBT (Listen before talk) adapted to a coexisting wireless communication system can be performed.

The control unit may perform LBT in the frequency band above the predetermined frequency, targeting a wider frequency band compared with the LBT performed in the frequency band below the predetermined frequency. According to the above-described arrangement, the terminal 20 can improve communication efficiency by performing LBT adapted to a system in a case of coexistence with the system, the system using a higher frequency or wider frequency band than in the conventional technologies.

The control unit may perform LBT in the frequency band above the predetermined frequency with a BWP (Bandwidth) bandwidth, channel bandwidth, or a minimum channel bandwidth. According to the above-described arrangement, the terminal 20 can improve communication efficiency by performing LBT adapted to a system in a case of coexistence with the system, the system using a higher frequency or wider frequency band than in the conventional technologies.

The control unit may perform LBT in the frequency band above the predetermined frequency using a smaller contention window size and shorter sensing period compared with LBT performed in the frequency band below the predetermined frequency. According to the above-described arrangement, the terminal 20 can improve communication efficiency by performing LBT adapted to a system in a case of coexistence with the system, the system using a higher frequency or wider frequency band than in the conventional technologies.

The control unit may perform LBT in the frequency band above the predetermined frequency for each set of antenna ports to which a same spatial filter is applied. According to the above-described arrangement, when a system uses a beam, the terminal 20 can improve communication efficiency by performing LBT that is adapted to the system.

Further, according to an embodiment of the present invention, a communication method is provided which includes a control procedure of performing LBT (listen before talk) in a frequency band above a predetermined frequency; and a transmission procedure of transmitting a signal based on a result of the LBT, wherein the control procedure includes a procedure of performing LBT with a mechanism different from LBT performed in frequency band below the predetermined frequency.

According to the above-described arrangement, the terminal 20 can improve communication efficiency by performing LBT adapted to a system that uses a higher frequency or wider frequency band than in the conventional technologies in a case of coexistence with the system. That is, in a wireless communication system, LBT (Listen before talk) adapted to a coexisting wireless communication system can be performed.

Supplement of Embodiment

As described above, one or more embodiments have been described. The present invention is not limited to the above embodiments. A person skilled in the art should understand that there are various modifications, variations, alternatives, replacements, etc., of the embodiments. In order to facilitate understanding of the present invention, specific values have been used in the description. However, unless otherwise specified, those values are merely examples and other appropriate values may be used. The division of the described items may not be essential to the present invention. The things that have been described in two or more items may be used in a combination if necessary, and the thing that has been described in one item may be appropriately applied to another item (as long as there is no contradiction). Boundaries of functional units or processing units in the functional block diagrams do not necessarily correspond to the boundaries of physical parts. Operations of multiple functional units may be physically performed by a single part, or an operation of a single functional unit may be physically performed by multiple parts. The order of sequences and flowcharts described in an embodiment of the present invention may be changed as long as there is no contradiction. For the sake of description convenience, the base station 10 and the terminal 20 have been described by using functional block diagrams. However, the apparatuses may be realized by hardware, software, or a combination of hardware and software. The software executed by a processor included in the base station 10 according to an embodiment of the present invention and the software executed by a processor included in the terminal 20 according to an embodiment of the present invention may be stored in a random access memory (RAM), a flash memory, a read only memory (ROM), an EPROM, an EEPROM, a register, a hard disk (HDD), a removable disk, a CD-ROM, a database, a server, or any other appropriate recording medium.

Further, information indication (transmission, notification) may be performed not only by methods described in an aspect/embodiment of the present specification but also a method other than those described in an aspect/embodiment of the present specification. For example, the information transmission may be performed by physical layer signaling (e.g., DCI (Downlink Control Information), UCI (Uplink Control Information)), upper layer signaling (e.g., RRC signaling, MAC signaling, broadcast information (MIB (Master Information Block), SIB (System Information Block))), other signals, or combinations thereof. Further, RRC signaling may be referred to as an RRC message. The RRC signaling may be, for example, an RRC connection setup message, an RRC connection reconfiguration message, or the like.

Each aspect/embodiment described in the present disclosure may be applied to at least one of a system using LTE (Long Term Evolution), LTE-A (LTE-Advanced), SUPER 3G, IMT-Advanced, 4G (4th generation mobile communication system), 5G (5th generation mobile communication system), FRA (Future Radio Access), NR (new Radio), W-CDMA (registered trademark), GSM (registered trademark), CDMA2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), and other appropriate systems, and a next generation system enhanced therefrom. Further, multiple systems may also be applied in combination (e.g., at least one of LTE and LTE-A combined with 5G, etc.).

The order of processing steps, sequences, flowcharts or the like of an aspect/embodiment described in the present specification may be changed as long as there is no contradiction. For example, in a method described in the present specification, elements of various steps are presented in an exemplary order. The order is not limited to the presented specific order.

The particular operations, that are supposed to be performed by the base station 10 in the present specification, may be performed by an upper node in some cases. In a network including one or more network nodes including the base station 10, it is apparent that various operations performed for communicating with the terminal 20 may be performed by the base station 10 and/or another network node other than the base station 10 (for example, but not limited to, MME or S-GW). According to the above, a case is described in which there is a single network node other than the base station 10. However, a combination of multiple other network nodes may be considered (e.g., MME and S-GW).

The information or signals described in this disclosure may be output from a higher layer (or lower layer) to a lower layer (or higher layer). The information or signals may be input or output through multiple network nodes.

The input or output information may be stored in a specific location (e.g., memory) or managed using management tables. The input or output information may be overwritten, updated, or added. The information that has been output may be deleted. The information that has been input may be transmitted to another apparatus.

A decision or a determination in an embodiment of the present invention may be realized by a value (0 or 1) represented by one bit, by a boolean value (true or false), or by comparison of numerical values (e.g., comparison with a predetermined value).

Software should be broadly interpreted to mean, whether referred to as software, firmware, middle-ware, microcode, hardware description language, or any other name, instructions, instruction sets, codes, code segments, program codes, programs, subprograms, software modules, applications, software applications, software packages, routines, subroutines, objects, executable files, executable threads, procedures, functions, and the like.

Further, software, instructions, information, and the like may be transmitted and received via a transmission medium. For example, in the case where software is transmitted from a website, server, or other remote source using at least one of wired line technologies (such as coaxial cable, fiber optic cable, twisted pair, digital subscriber line (DSL)) and wireless technologies (infrared, microwave, etc.), at least one of these wired line technologies and wireless technologies is included within the definition of the transmission medium.

Information, a signal, or the like, described in the present specification may represented by using any one of various different technologies. For example, data, an instruction, a command, information, a signal, a bit, a symbol, a chip, or the like, described throughout the present application, may be represented by a voltage, an electric current, electromagnetic waves, magnetic fields, a magnetic particle, optical fields, a photon, or a combination thereof.

It should be noted that a term used in the present specification and/or a term required for understanding of the present specification may be replaced by a term having the same or similar meaning. For example, a channel and/or a symbol may be a signal (signaling). Further, a signal may be a message. Further, the component carrier (CC) may be referred to as a carrier frequency, cell, frequency carrier, or the like.

As used in the present disclosure, the terms "system" and "network" are used interchangeably.

Further, the information, parameters, and the like, described in the present disclosure may be expressed using absolute values, relative values from predetermined values, or they may be expressed using corresponding different information. For example, a radio resource may be what is indicated by an index.

The names used for the parameters described above are not used as limitations. Further, the mathematical equations using these parameters may differ from those explicitly disclosed in the present disclosure. Because the various channels (e.g., PUCCH, PDCCH) and information elements may be identified by any suitable names, the various names assigned to these various channels and information elements are not used as limitations.

In the present disclosure, the terms "BS: Base Station", "Radio Base Station", "Base Station Apparatus", "Fixed Station", "NodeB", "eNodeB (eNB)", "gNodeB (gNB)", "Access Point", "Transmission Point", "Reception Point", "Transmission/Reception Point", "Cell", "Sector", "Cell Group", "Carrier", "Component Carrier", and the like, may be used interchangeably. The base station may be referred to as a macro-cell, a small cell, a femtocell, a picocell and the like.

The base station may accommodate (provide) one or more (e.g., three) cells. In the case where the base station accommodates a plurality of cells, the entire coverage area of the base station may be divided into a plurality of smaller areas, each smaller area may provide communication services by means of a base station subsystem (e.g., an indoor small base station or a remote Radio Head (RRH)). The term "cell" or "sector" refers to a part or all of the coverage area of at least one of the base station and base station subsystem that provides communication services at the coverage.

In the present disclosure, terms such as "mobile station (MS)", "user terminal", "user equipment (UE)", "terminal", and the like, may be used interchangeably.

There is a case in which the mobile station may be referred to, by a person skilled in the art, as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other appropriate terms.

At least one of the base station and the mobile station may be referred to as a transmission apparatus, reception apparatus, communication apparatus, or the like. The at least one of the base station and the mobile station may be a device mounted on the mobile station, the mobile station itself, or the like. The mobile station may be a vehicle (e.g., a car, an airplane, etc.), an unmanned mobile body (e.g., a drone, an automated vehicle, etc.), or a robot (manned or unmanned). At least one of the base station and the mobile station may include an apparatus that does not necessarily move during communication operations. For example, at least one of the base station and the mobile station may be an IoT (Internet of Things) device such as a sensor.

Further, the base station in the present disclosure may be read as the user terminal. For example, each aspect/embodiment of the present disclosure may be applied to a configuration in which communications between the base station and the user terminal are replaced by communications between multiple terminals 20 (e.g., may be referred to as D2D (Device-to-Device), V2X (Vehicle-to-Everything), etc.). In this case, the function of the base station 10 described above may be provided by the terminal 20. Further, the phrases "up" and "down" may also be replaced by the phrases corresponding to terminal-to-terminal communication (e.g., "side"). For example, an uplink channel, an downlink channel, or the like, may be read as a sidelink channel.

Further, the user terminal in the present disclosure may be read as the base station. In this case, the function of the user terminal described above may be provided by the base station.

The term "determining" used in the present specification may include various actions or operations. The "determining" may include, for example, a case in which "judging", "calculating", "computing", "processing", "deriving", "investigating", "looking up, search, inquiry" (e.g., looking up a table, database, or other data structures), or "ascertaining" is deemed as "determining". Further, the "determining" may include a case in which "receiving" (e.g., receiving information), "transmitting" (e.g., transmitting information), "inputting", "outputting", or "accessing" (e.g., accessing data in a memory) is deemed as "determining". Further, the "determining" may include a case in which "resolving", "selecting", "choosing", "establishing", "comparing", or the like is deemed as "determining". In other words, the "determining" may include a case in which a certain action or operation is deemed as "determining". Further, "decision" may be read as "assuming," "expecting," or "considering," etc.

The term "connected" or "coupled" or any variation thereof means any direct or indirect connection or connection between two or more elements and may include the presence of one or more intermediate elements between the two elements "connected" or "coupled" with each other. The coupling or connection between the elements may be physical, logical, or a combination thereof. For example, "connection" may be read as "access". As used in the present disclosure, the two elements may be thought of as being "connected" or "coupled" to each other using at least one of the one or more wires, cables, and printed electrical connections and, as a number of non-limiting and non-inclusive examples, electromagnetic energy having wavelengths in the radio frequency region, the microwave region, and the light (both visible and invisible) region.

The reference signal may be abbreviated as RS or may be referred to as a pilot, depending on the applied standards.

The description "based on" used in the present specification does not mean "based on only" unless otherwise specifically noted. In other words, the phrase "base on" means both "based on only" and "based on at least".

Any reference to an element using terms such as "first" or "second" as used in the present disclosure does not generally limit the amount or the order of those elements. These terms may be used in the present disclosure as a convenient way to distinguish between two or more elements. Therefore, references to the first and second elements do not imply that only two elements may be employed or that the first element must in some way precede the second element.

"Means" included in the configuration of each of the above apparatuses may be replaced by "parts," "circuits," "devices," etc.

In the case where the terms "include", "including" and variations thereof are used in the present disclosure, these terms are intended to be comprehensive in the same way as the term "comprising". Further, the term "or" used in the present specification is not intended to be an "exclusive or".

A radio frame may include one or more frames in the time domain. Each of the one or more frames in the time domain may be referred to as a subframe. The subframe may further include one or more slots in the time domain. The subframe may be a fixed length of time (e.g., 1 ms) independent from the numerology.

The numerology may be a communication parameter that is applied to at least one of the transmission and reception of a signal or channel. The numerology may indicate at least one of, for example, SubCarrier Spacing (SCS), bandwidth, symbol length, cyclic prefix length, transmission time interval (TTI), number of symbols per TTI, radio frame configuration, specific filtering processing performed by the transceiver in the frequency domain, and specific windowing processing performed by the transceiver in the time domain.

The slot may include one or more symbols in the time domain, such as OFDM (Orthogonal Frequency Division Multiplexing) symbols, SC-FDMA (Single Carrier Frequency Division Multiple Access) symbols, and the like. The slot may be a time unit based on the numerology.

The slot may include a plurality of mini slots. Each mini slot may include one or more symbols in the time domain. Further, the mini slot may be referred to as a sub-slot. The mini slot may include fewer symbols than the slot. PDSCH (or PUSCH) transmitted in time units greater than a mini slot may be referred to as PDSCH (or PUSCH) mapping type A. PDSCH (or PUSCH) transmitted using a mini slot may be referred to as PDSCH (or PUSCH) mapping type B.

A radio frame, a subframe, a slot, a mini slot and a symbol all represent time units for transmitting signals. Different terms may be used for referring to a radio frame, a subframe, a slot, a mini slot and a symbol, respectively.

For example, one subframe may be referred to as a transmission time interval (TTI), multiple consecutive subframes may be referred to as a TTI, and one slot or one mini slot may be referred to as a TTI. In other words, at least one of the subframe and the TTI may be a subframe (1 ms) in an existing LTE, a period shorter than 1 ms (e.g., 1-13 symbols), or a period longer than 1 ms. It should be noted that the unit representing the TTI may be referred to as a slot, a mini slot, or the like, rather than a subframe.

The TTI refers to, for example, the minimum time unit for scheduling in wireless communications. For example, in an LTE system, a base station schedules each terminal 20 to allocate radio resources (such as frequency bandwidth, transmission power, etc. that can be used in each terminal 20) in TTI units. The definition of TTI is not limited to the above.

The TTI may be a transmission time unit, such as a channel-encoded data packet (transport block), code block, codeword, or the like, or may be a processing unit, such as scheduling or link adaptation. It should be noted that, when a TTI is provided, the time interval (e.g., the number of symbols) during which the transport block, code block, codeword, or the like, is actually mapped may be shorter than the TTI.

It should be noted that, when one slot or one mini slot is referred to as a TTI, one or more TTIs (i.e., one or more slots or one or more mini slots) may be the minimum time unit for scheduling. Further, the number of slots (the number of mini slots) constituting the minimum time unit of the scheduling may be controlled.

A TTI having a time length of 1 ms may be referred to as a normal TTI (a TTI in LTE Rel. 8-12), a long TTI, a normal subframe, a long subframe, a slot, and the like. A TTI that is shorter than the normal TTI may be referred to as a shortened TTI, a short TTI, a partial TTI (or fractional TTI), a shortened subframe, a short subframe, a mini slot, a subslot, a slot, or the like.

It should be noted that the long TTI (e.g., normal TTI, subframe, etc.,) may be replaced with a TTI having a time length exceeding 1 ms, and the short TTI (e.g., shortened TTI, etc.,) may be replaced with a TTI having a TTI length less than the TTI length of the long TTI and a TTI length greater than 1 ms.

A resource block (RB) is a time domain and frequency domain resource allocation unit and may include one or more consecutive subcarriers in the frequency domain. The number of subcarriers included in a RB may be the same, regardless of the numerology, and may be 12, for example. The number of subcarriers included in a RB may be determined on the basis of numerology.

Further, the time domain of a RB may include one or more symbols, which may be 1 slot, 1 mini slot, 1 subframe, or 1 TTI in length. One TTI, one subframe, etc., may each include one or more resource blocks.

It should be noted that one or more RBs may be referred to as physical resource blocks (PRBs, Physical RBs), subcarrier groups (SCGs), resource element groups (REGs), PRB pairs, RB pairs, and the like.

Further, a resource block may include one or more resource elements (RE). For example, 1 RE may be a radio resource area of one sub-carrier and one symbol.

The bandwidth part (BWP) (which may also be referred to as a partial bandwidth, etc.) may represent a subset of consecutive common RBs (common resource blocks) for a given numerology in a carrier. Here, a common RB may be identified by an index of RB relative to the common reference point of the carrier. A PRB may be defined in a BWP and may be numbered within the BWP.

BWP may include BWP for UL (UL BWP) and BWP for DL (DL BWP). For a UE, one or more BWPs may be configured in one carrier.

At least one of the configured BWPs may be activated, and the UE may assume that the UE will not transmit and receive signals/channels outside the activated BWP. It should be noted that the terms "cell" and "carrier" in this disclosure may be replaced by "BWP."

Structures of a radio frame, a subframe, a slot, a mini slot, and a symbol described above are exemplary only. For example, the number of subframes included in a radio frame, the number of slots per subframe or radio frame, the number of mini slots included in a slot, the number of symbols and RBs included in a slot or mini slot, the number of subcarriers included in a RB, the number of symbols in a TTI, the symbol length, the cyclic prefix (CP) length, and the like, may changed in various ways.

In the present disclosure, where an article is added by translation, for example "a", "an", and "the", the disclosure may include that the noun following these articles is plural.

In this disclosure, the term "A and B are different" may mean "A and B are different from each other." It should be noted that the term "A and B are different" may mean "A and B are different from C." Terms such as "separated" or "combined" may be interpreted in the same way as the above-described "different".

An aspect/embodiment described in the present specification may be used independently, may be used in combination, or may be used by switching according to operations. Further, notification (transmission/reporting) of predetermined information (e.g., notification (transmission/reporting) of "X") is not limited to an explicit notification (transmission/reporting), and may be performed by an implicit notification (transmission/reporting) (e.g., by not performing notification (transmission/reporting) of the predetermined information).

It is noted that OFDM in the present disclosure is an example of a multi-carrier signal.

As described above, the present invention has been described in detail. It is apparent to a person skilled in the art that the present invention is not limited to one or more embodiments of the present invention described in the present specification. Modifications, alternatives, replacements, etc., of the present invention may be possible without departing from the subject matter and the scope of the present invention defined by the descriptions of claims. Therefore, the descriptions of the present specification are for illustrative purposes only, and are not intended to be limitations to the present invention.

DESCRIPTION OF THE REFERENCE NUMERALS

10 Base station
110 Transmission unit
120 Reception unit
130 Configuration unit 140 Control unit
20 Terminal
210 Transmission unit
220 Reception unit
230 Configuration unit
240 Control unit
30 Core network
1001 Processor
1002 Storage device
1003 Auxiliary storage device
1004 Communication device
1005 Input device
1006 Output device

The invention claimed is:

1. A terminal comprising:
a control unit configured to perform a channel access procedure in a frequency band above a predetermined frequency; and
a transmission unit configured to transmit a signal based on a result of the channel access procedure,
wherein the control unit performs the channel access procedure with a frequency bandwidth of a bandwidth part (BWP), determines an energy detection (ED) threshold value applied to the channel access procedure to be a value obtained by adding a predetermined value to a value that is proportional to the frequency bandwidth with which the channel access procedure is performed, and applies a maximum contention window size, which is less than a maximum contention window size that is applied to the channel access procedure that is performed with a frequency band below the predetermined frequency, to the channel access procedure.

2. The terminal as claimed in claim 1, wherein the control unit applies a number of channel access priority classes to the channel access procedure, the number being less than the number of the channel access priority classes that is applied to the channel access procedure that is performed with the frequency band below the predetermined frequency.

3. A communication method comprising:
a procedure of performing a channel access procedure in a frequency band above a predetermined frequency;
a procedure of transmitting a signal based on a result of channel access procedure; and
a procedure of performing the channel access procedure with a frequency bandwidth of a bandwidth part (BWP), determining an energy detection (ED) threshold value applied to the channel access procedure to be a value obtained by adding a predetermined value to a value that is proportional to the frequency bandwidth with which the channel access procedure is performed, and applying a maximum contention window size, which is less than a maximum contention window size that is applied to the channel access procedure that is performed with a frequency band below the predetermined frequency, to the channel access procedure.

4. A base station comprising:
a control unit configured to perform a channel access procedure in a frequency band above a predetermined frequency; and
a transmission unit configured to transmit a signal based on a result of the channel access procedure,
wherein the control unit performs the channel access procedure with a frequency bandwidth of a bandwidth part (BWP), determines an energy detection (ED) threshold value applied to the channel access procedure to be a value obtained by adding a predetermined value to a value that is proportional to the frequency bandwidth with which the channel access procedure is performed, and applies a maximum contention window size, which is less than a maximum contention window size that is applied to the channel access procedure that is performed with a frequency band below the predetermined frequency, to the channel access procedure.

* * * * *